Jan. 28, 1964  S. H. A. SCHMAUS  3,119,914
SEQUENTIALLY OPERABLE TEMPERATURE RESPONSIVE SWITCH
Filed March 28, 1961  3 Sheets-Sheet 1

INVENTOR
SIEGFRIED H.A. SCHMAUS
BY Robertson & Smythe
ATTORNEYS

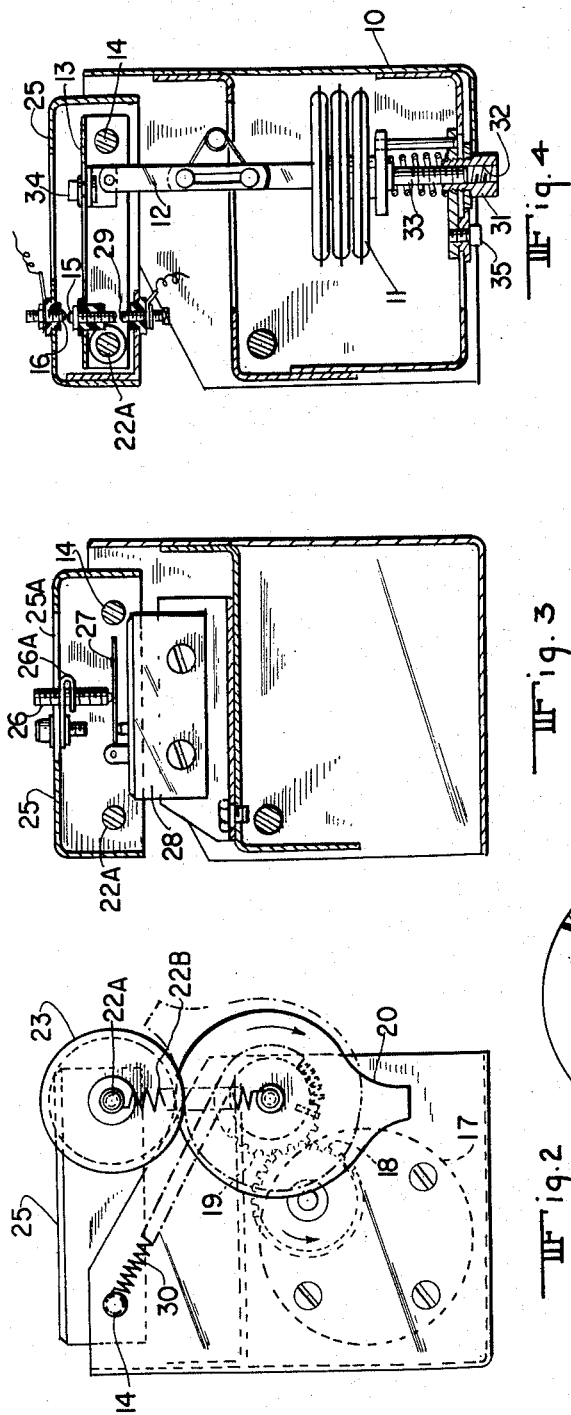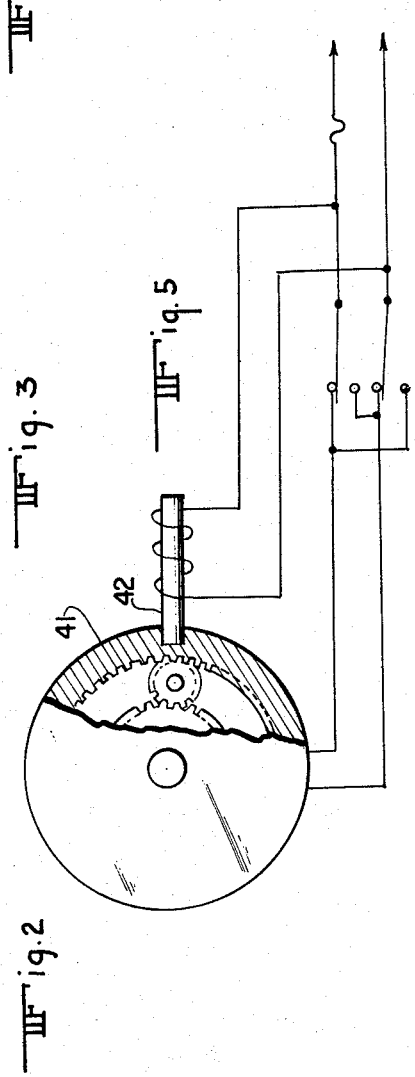

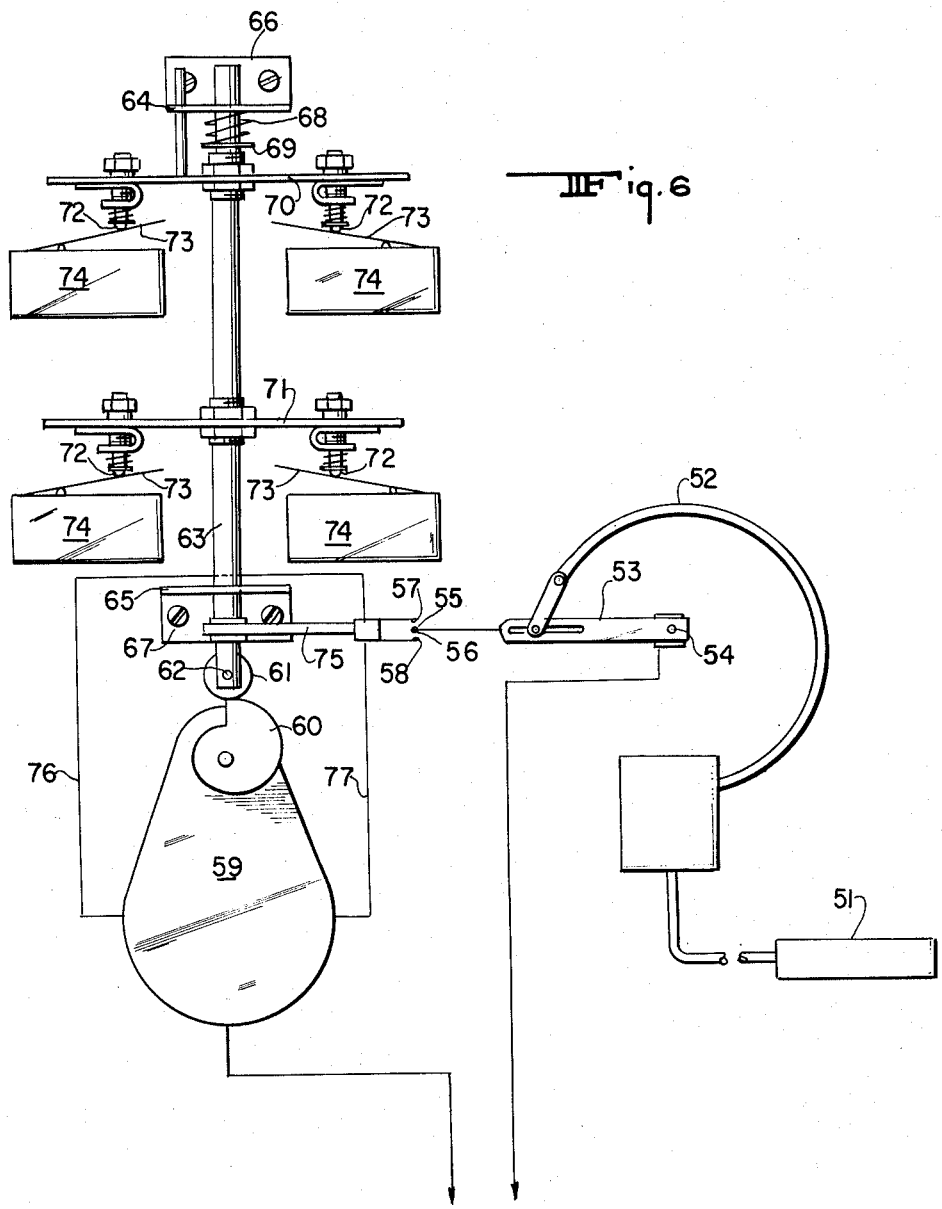

United States Patent Office 3,119,914
Patented Jan. 28, 1964

3,119,914
SEQUENTIALLY OPERABLE TEMPERATURE RESPONSIVE SWITCH
Siegfried H. A. Schmaus, Philadelphia, Pa., assignor to Ametek, Inc., a corporation of Delaware
Filed Mar. 28, 1961, Ser. No. 98,973
9 Claims. (Cl. 200—140)

This invention relates to switches and in particular switches that are actuated in response to a measured change in a variable condition.

In many conditioning systems, such as an electric room or building heating arrangement, sequential operation of a plurality of individual electrical circuits may be desirable in order to maintain a predetermined substantially constant condition at a particular location with the highest efficiency. In some of these arrangements, sequence switches may be required which need a greater than normal operation force and this would necessitate a relatively strong condition responsive actuating force.

One of the objects of the invention is to provide a control system which will operate heavy sequence switches with a relatively low force condition responsive means.

A further object is to provide a control instrument which will return the heating elements to a safe condition upon failure of power.

Another object is to provide an instrument having a remote control feature.

In one aspect of the invention, the sequence switch assembly may include circuit actuating means controlled by means responsive to a variable condition, and contact means in the path of the circuit actuating means for closing an electric motor circuit. Drive means, including a motor, may be provided to move the contact means away from the circuit actuating means and thereby open the circuit. Also included are a plurality of switches and means on a member common with the contact means for actuating the switches in any predetermined sequential order.

The foregoing and other objects, advantages and features of the invention will become apparent from the following description and drawings, which are merely exemplary.

In the drawings:

FIG. 2 is an end view of the assembly looking in the direction of the arrows from lines 2—2 of FIG. 1;

FIG. 3 is a vertical sectional view taken along the lines 3—3 of FIG. 1;

FIG. 4 is a vertical sectional view taken along the lines 4—4 of FIG. 1;

FIG. 5 is a schematic diagram of the reversible electric motor circuit further showing the solenoid and detent means for the motor gearing; and FIG. 6 is an elevational view of another embodiment of the invention.

Figure 1:
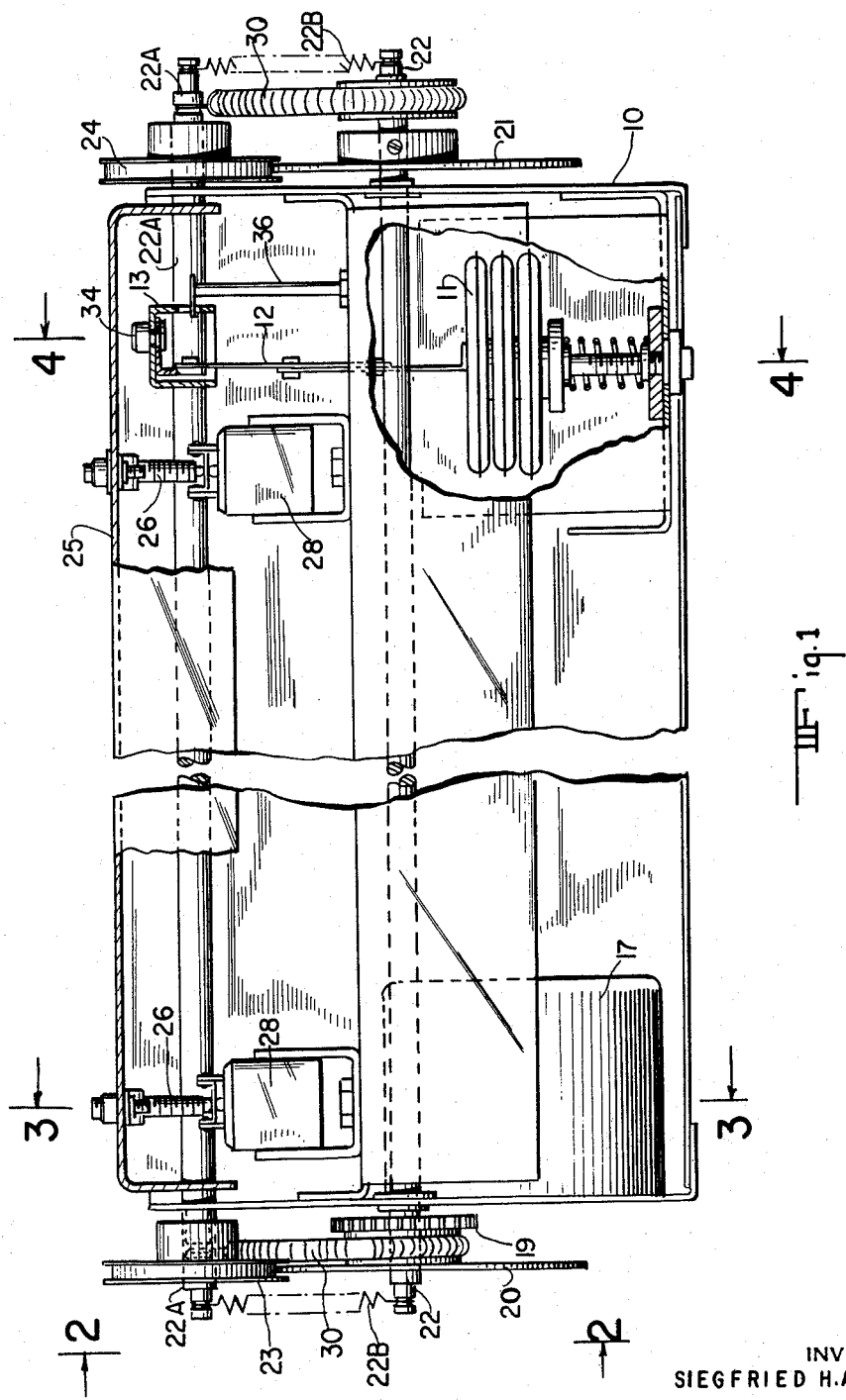
FIG. 1 is a front elevational view of a preferred sequence switch assembly with parts broken away in section to illustrate principles of the invention.

In one embodiment of the invention, the frame 10 (FIG. 1) of the sequence switch assembly may have mounted therein a condition responsive means such as a bellows 11 responsive to a condition pressure. The bellows may actuate an override link 12 to pivot a lever or arm 13 (FIGS. 1, 4) or the like, within the range permitted by stop member 36, about the shaft 14. Adjustably secured on the lever remote from the pivot 14 is a contact 15.

Also pivotally mounted about shaft or pivot 14 is a shelf member 25 that substantially overlies and partially encloses lever 13. Adjustable contacts 16 and 29 are secured on upper and lower portions, respectively, of the shelf. The contacts 16 and 29 are positioned in the path of and adjacent contact 15 and are adapted to close a circuit to a reversible motor 17 (FIG. 2). Clockwise pivotal movement of lever 13, as viewed in FIG. 4, will elevate contact 15 to meet contact 16 and thereby operate motor 17 to rotate the shelf in a clockwise direction (FIG. 4) until the contacts separate which will stop the motor when the condition responsive means is satisfied. Upon counter-clockwise movement of lever 13 rotation of the shelf 25 will move similarly in the opposite direction.

In one form, motor 17 may have a planetary gear arrangement (FIG. 5) wherein the outer gear 41 thereof is locked by a solenoid and detent 42 when power is applied to the motor. With the outer gear so held, operation of the motor will transmit power through the epicyclic gear train to a gear shaft to drive gear 18. Gear 19, driven by gear 18, is mounted on shaft 22 which fixedly carries cams 20, 21 at its ends. Rotatably mounted on a shaft 22A (FIGS. 1, 2, 4) are cam followers or wheels 23, 24 which are in vertical alignment (FIG. 1) with the cams 20, 21, respectively. The shaft 22A is fixedly connected to end walls of the shelf 25 at substantially the same elevation as shaft 14, and passes with appropriate clearance through apertures in the side walls of lever 13 (FIG. 4). The clearance should be sufficient to permit the necessary pivotal movement of lever 13 relative to shelf 25 so that the contact 15 may readily move from an initial open or intermediate position to an abutting position with either of contacts 16 or 29. The camming effect upon the wheels 23, 24 will effect pivoting of shelf 25 about shaft 14.

A plurality of snap-acting sequence switches 28 of the required capacity (FIGS. 1, 3) may be laterally positioned adjacent and below the pivotable shelf 25. The switches 28 may be a part of an electric heating arrangement wherein a predetermined sequential energization of the heater elements may be desired, or they may form a part of any other type of arrangement where sequence switches are employed and the desired closing or operation thereof may be of any predetermined sequential order.

A plurality of sequence switch actuating members 26 are preferably mounted on the pivotable shelf 25. Upon pivotal movement of the shelf, the switch actuating members 26 may reciprocate toward or away from spring members 27 that are pivotally secured to the switches and overlie upwardly biased plungers thereof. Each of the switch actuating members 26 preferably may be threadedly secured to a laterally adjustably mounted clip 26A such that each is longitudinally adjustable with respect to said clip and is laterally adjustable with said clip in one of the laterally extending parallel slots 25A (FIG. 3) provided in the shelf. These adjustable features respectively permit adjustments of each member 26 perpendicularly to and longitudinally of its underlying spring member 27. The switches preferably are a snap-acting type wherein the actuating members 26 are set in a predetermined position with respect to its spring member 27 to normally force the upwardly biased switch plunger down into an intermediate or open condition. Movement of the actuating member 26 downwardly will be transmitted to the switch plunger to overcome the upward bias thereof and thereby de-energize its circuit, whereas upward movement of member 26 away from spring member 27 will permit the upward bias to move the switch plunger upwardly to a closed position thereby energizing the circuit. Lateral adjustments of the various clip arrangements 26A will permit a predetermined selection of the sequence switch actuations, since clip adjustments to the right (FIG. 3) or toward pivot shaft 14 will relatively lengthen the time in which a corresponding switch will be actuated.

Suitable lateral openings in lever 13 and frame 10 permit adjusting screw means 34, 35 (FIG. 4) to laterally adjust the position of the condition responsive means 11 and override link 12 so as to adjust the angular movement of the lever 13 relative to a given variation or effect upon the condition responsive means 11. It shouuld be noted that appreciable angular movements of lever 13 and shelf 25 are to be substantially the same. An access opening in the shelf member 25 may be provided adjacent adjusting member 34. Another adjusting feature may be provided for controlling the effect of the condition responsive means 11 upon lever 13. For example, the bellows 11 may have extending therefrom a threaded stud 33 which receives the internal threads 32 of screw 31. The adjusting screw 31 may be rotated to move the bottom position of the bellows 11 to a desired position, to vary the condition at which the bellows will transmit motion to lever 13.

From the foregoing structural description it can be readily understood that a predetermined increment in the measured condition, (such as a pressure increase to the bellows 11 in response to an increase in room temperature), will cause the condition responsive means 11 to effect a clockwise pivotal movement of lever 13 (FIG. 4) about shaft 14 such that contact 15 will abut contact 16 to energize motor 17 which will effect a counter-clockwise rotation of gear 18 (FIG. 2). Gear 18 will drive gear 19 and cams 20, 21 in a clockwise direction to move an increased camming surface under wheels 23, 24 and thereby effect pivotal movement of shelf 25 about shaft 14 in a clockwise direction as viewed in FIG. 4. Lever 13 and shelf 25 will thus pivot substantially together, as long as the contacts 15 and 16 are abutting each other, until such time that the lever 13 will no longer continue such pivotal movement due to lack of increment in the measured condition or the lever 13 abutting stop means 36. When shelf 25 continues to pivot it will cause contact 16 to move away from contact 15 and break the electric motor circuit. Such pivotal movement of the shelf 25 will have raised some of the switch actuators 26 away from spring member 27 to permit energization of some of the circuits controlled by the snap-acting switches 28, which will tend to restore the measured condition to its normal or desired state. This restoration trend will produce an opposite effect upon the condition responsive means to cause counter-clockwise movement of lever 13 whereupon contact 15 will meet or abut contact 29 to operate the motor and mechanical drive means in the opposite direction to ultimately cause counter-clockwise pivoting of shelf 25 as viewed in FIG. 4. When the measured condition reaches its normal or desired state, the operative parts will have returned to their original positions.

Should there develop a power failure to the motor 17, a "fail-safe" arrangement is provided wherein the solenoid and detent 42 (FIG. 5) will release the outer gear 41 and permit the springs 30, 30 (FIGS. 1, 2), each affixed by its ends to shafts 14 and 22, to return gear 19 and cams 20, 21 to their original positions, permitting springs 22B to return shelf 25 and the switch actuators 26 carried thereby to their original positions with the switches 28 in open positions.

It should be apparent that if motor power fails, then the switch arrangement will open the circuits to the heating means.

In another embodiment of the invention, the condition responsive means 51 (FIG. 6) may be pressure responsive to temperature change, for example, to transmit motion to a Bourdon tube 52, as is well known in the art, to oscillate lever 53 about a fixed pivot 54. At the free end of the lever, a pair of contacts 55, 56 are positioned back to back intermediate spaced contacts 57, 58 so as to be adapted to close either of two electric circuits for actuation of a reversible electric motor 59 in either direction. The motor 59 through appropriate gearing will rotate cam 60. The motor 59 may be of the type 17 described above, including the fail-safe feature wherein spring 68 will perform the function of springs 22B. Cam follower or roller 61 journalled at 62 to rod 63 will impart vertical movement to the rod 63. The rod 63 may extend through and be guided by suitable guide openings in horizontally extending portions 64, 65 of fixed support brackets 66, 67. The upper portion of the rod may have a flange member 69 and a spring member 68 may be concentrically positioned about the rod intermediate the upper side of the flange and the under side of the horizontal bracket portion 64 to urge or bias the cam follower 61 against the cam 60.

Adjustably mounted on the rod 63 are a pair of vertically spaced horizontally extending plates 70, 71 each of which is adapted to carry a plurality of selectively positioned adjustable switch actuators 72. Positioned in the path of the switch actuators 72 are corresponding spring members 73 pivoted to their relatively heavy snap-acting sequence switches 74. The adjustability of the various switch actuators 72 for switches 74 may be similar to the adjustability of the switch actuators 26 of switches 28 described above, and there may be a similar arrangement of switches, actuators, spring members and biased plungers.

The rod 63 also carries, for vertical movement therewith, a horizontally extending arm 75 upon which are mounted the aforementioned spaced contacts 57, 58.

Thus, when a change in condition occurs, such as a pressure increase responsive to a decrease in temperature of the measured variable, lever 53 will pivot in a clockwise direction to place contact 55 in abutment contact 57 and thereby close an electric circuit including line 76 to operate the reversible motor 59 in one direction, such as to impart clockwise movement to cam 60 about its shaft. By such movement the rod 63 will be moved or cammed upwardly carrying therewith the switch actuators 72 and the contacts 57, 58 on arm 75. Contact 55 will continue to abut the upwardly moving contact 57 thereby maintaining the energized motor circuit until the change in condition subsides and travel of contact 55 is halted which will open the circuit and stop the motor and upward travel of rod 63. Thus, by predetermined sequential actuation of one or more of the switches 74 the measured variable may be changed in the opposite direction to return toward its normal or desired condition in a similar manner as that of the first embodiment. The opposite condition change will cause contact 56 to move down to abut contact 58 to energize the motor circuit including line 77 to reversely operate the motor and thereby rotate cam 60 in a counter-clockwise direction to affect a downward movement of rod 63 and the elements 72, 58 carried therewith. Contact 56 will continue to abut the downwardly moving contact 58 until the measured variable reaches a status quo condition whence travel of contact 56 will stop and thereby open the motor circuit to stop the motor and the downward movement of rod 63.

It is understood that the foregoing description is merely intended for the purpose of illustration, and that the principles of the invention are not intended to be limited thereto, except as defined in the appended claims.

What is claimed is:

1. In a sequence switch assembly, the combination comprising circuit actuating means controlled by condition responsive means, movable contact means in the path of said actuating means and adapted to close an electric motor circuit, drive means for moving said contact means away from said circuit actuating means to open said circuit, a plurality of switches, and means on a member common with said movable contact means for actuating said switches in any predetermined sequential order when said contact means is moved by said drive means.

2. In a sequence switch assembly, the combination comprising circuit actuating means controlled by condition responsive means, movable contact means in the path of said actuating means and adapted to close an electric motor circuit, drive means for moving said contact means away from said circuit actuating means to open said circuit, means for returning said contact means to its original position should there develop a power failure to said motor, a plurality of switches, and means on a member common with said movable contact means for actuating said switches in any predetermined sequential order when said contact means is moved by said drive means.

3. In a sequence switch assembly, the combination comprising circuit actuating means controlled by condition responsive means, movable contact means in the path of said actuating means and adapted to close an electric motor circuit, drive means for moving said contact means away from said circuit actuating means to open said circuit, said drive means also including cam means interposed between said motor and a member common with said movable contact means, cam follower means connected to said member, gear means operated by said motor to actuate said cam means, a plurality of switches, and means on said member for actuating said switches in any predetermined sequential order when said contact means is moved by said drive means.

4. In a sequence switch assembly, the combination comprising circuit actuating means controlled by condition responsive means, movable contact means in the path of said actuating means and adapted to close an electric motor circuit, drive means for moving said contact means away from said circuit actuating means to open said circuit, said drive means also including cam means interposed between said motor and a member common with said movable contact means, cam follower means connected to said member, gear means operated by said motor to actuate said cam means, means for returning said contact means to its original position should there develop power failure to said motor, a plurality of switches, and means on said member for actuating said switches in any predetermined sequential order when said contact means is moved by said drive means.

5. In a sequence switch assembly, the combination comprising condition responsive means connected to a pivoted member adapted to pivot said member in either of opposing directions, a contact on said pivoted member, a second pivotally mounted member enclosing a portion of said first member, a pair of contacts on said second member and positioned on opposite sides of said contact and in the path of said contact, a reversible motor adapted to be actuated by closing of said contact upon one of said pair of contacts, mechanical drive means operated by said motor for pivoting said second member in accordance with corresponding angular movements of said first member, a plurality of switches positioned adjacent said second member, and means on said second member for actuating said switches in any predetermined sequential order upon pivotal movement of said second member.

6. In a sequence switch assembly, the combination comprising condition responsive means connected to a pivoted member adapted to pivot said member in either of opposing directions, a contact on said pivoted member, a second pivotally mounted member enclosing a portion of said first member, a pair of contacts on said second member and positioned on opposite sides of said contact and in the path of said contact, a reversible motor adapted to be actuated by closing of said contact upon one of said pair of contacts, mechanical drive means operated by said motor for pivoting said second member in accordance with corresponding angular movements of said first member, said mechanical drive means including cam means interposed between said motor and said second member, cam follower means connected to said second member, gear means operated by said motor to actuate said cam means, a plurality of switches positioned adjacent said second member, and means on said second member for actuating said switches in any predetermined sequential order upon pivotal movement of said second member.

7. In a sequence switch assembly, the combination comprising condition responsive means connected to a pivoted member adapted to pivot said member in either of opposing directions, a contact on said pivoted member, a second pivotally mounted member enclosing a portion of said first member, a pair of contacts on said second member and positioned on opposite sides of said contact and in the path of said contact, a reversible motor adapted to be actuated by closing of said contact upon one of said pair of contacts, mechanical drive means operated by said motor for pivoting said second member in accordance with corresponding angular movements of said first member, means for returning said second member to its original position should there develop a power failure to said motor, a plurality of switches positioned adjacent said second member, and means on said second member for actuating said switches in any predemtermined sequential order upon pivotal movement of said second member.

8. In a sequence switch assembly, the combination comprising condition responsive means connected to a pivoted member adapted to pivot said member in either of opposing directions, a contact on said pivoted member, a second pivotally mounted member enclosing a portion of said first member, a pair of contacts on said second member and positioned on opposite sides of said contact and in the path of said contact, a reversible motor adapted to be actuated by one of said pair of contacts, mechanical drive means operated by said motor for pivoting said second member in accordance with corresponding angular movements of said first member, said mechanical drive means including cam means interposed between said motor and said second member, cam follower means connected to said second member, gear means operated by said motor to actuate said cam means, means for returning said second member to its original position should there develop a power failure to said motor, a plurality of switches positioned adjacent said second member, and means on said second member for actuating said switches in any predetermined sequential order upon pivotal movement of said second member.

9. In a sequence switch assembly, the combination comprising condition responsive means connected to a pivoted member adapted to pivot said member in either of opposing directions, a contact on said pivoted member, a second pivotally mounted member enclosing a portion of said first member, a pair of contacts on said second member and positioned on opposite sides of said contact and in the path of said contact, a reversible motor adapted to be actuated by closing of said contact upon one of said pair of contacts, mechanical drive means operated by said motor for pivoting said second member in accordance with corresponding angular movements of said first member, adjustable clamping means for laterally positioning said condition responsive means to vary angular pivoting of said first member, a plurality of switches positioned adjacent said second member, and adjustable switch actuating means on said second member for actuating said switches in any predetermined sequential order upon pivotal movement of said second member.

References Cited in the file of this patent
UNITED STATES PATENTS

| | | |
|---|---|---|
| 2,788,416 | Kilbury | Apr. 9, 1957 |
| 2,955,172 | Westcott et al. | Oct. 4, 1960 |